US011833889B2

(12) United States Patent
Sun et al.

(10) Patent No.: US 11,833,889 B2
(45) Date of Patent: Dec. 5, 2023

(54) TRANSPORT REFRIGERATION UNIT WITH ENGINE HEAT FOR DEFROSTING

(71) Applicant: CARRIER CORPORATION, Palm Beach Gardens, FL (US)

(72) Inventors: Jian Sun, Fayetteville, NY (US); Yinshan Feng, Manchester, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 382 days.

(21) Appl. No.: 17/056,969

(22) PCT Filed: Sep. 3, 2019

(86) PCT No.: PCT/US2019/049360
§ 371 (c)(1),
(2) Date: Nov. 19, 2020

(87) PCT Pub. No.: WO2020/055628
PCT Pub. Date: Mar. 19, 2020

(65) Prior Publication Data
US 2021/0213807 A1    Jul. 15, 2021

Related U.S. Application Data

(60) Provisional application No. 62/730,915, filed on Sep. 13, 2018.

(51) Int. Cl.
*B60H 1/32* (2006.01)
*F25B 47/02* (2006.01)
*F25B 31/02* (2006.01)

(52) U.S. Cl.
CPC ......... *B60H 1/3232* (2013.01); *F25B 47/022* (2013.01); *F25B 31/02* (2013.01);
(Continued)

(58) Field of Classification Search
CPC ....... B60H 1/3232; B60H 1/3226; B60P 3/20; F25B 47/022; F25B 31/02; F25B 31/006;
(Continued)

(56) References Cited

U.S. PATENT DOCUMENTS 2,430,960 A   11/1947   Soling
2,762,206 A    9/1956   Ashley
(Continued)

FOREIGN PATENT DOCUMENTS

CN      1884940 B    2/2012
CN    207365276 U    5/2018
(Continued)

OTHER PUBLICATIONS

International Search Report Application No. PCT/US2019/049360; dated Oct. 28, 2019; pp. 6.
(Continued)

*Primary Examiner* — Miguel A Diaz
(74) *Attorney, Agent, or Firm* — CANTOR COLBURN LLP

(57) ABSTRACT

A transport refrigeration unit is provided and includes a compressor, a condenser, an expansion valve, an evaporator, piping fluidly coupling the compressor and the condenser, a fluid loop to produce heated fluid from an engine, which is configured to drive operations of the compressor, a heat exchanger disposed in the refrigeration cycle such that the heated fluid thermally interacts with refrigerant of the refrigeration cycle and a hot gas bypass valve to control a quantity of refrigerant removed from the piping.

11 Claims, 2 Drawing Sheets

(52) U.S. Cl.
CPC ............... *F25B 2400/0403* (2013.01); *F25B 2400/0411* (2013.01); *F25B 2600/2501* (2013.01)

(58) Field of Classification Search
CPC ...... F25B 2400/0403; F25B 2400/0411; F25B 2600/2503; F25B 7/00; F25B 25/005; F25D 11/003
See application file for complete search history.

(56) References Cited

U.S. PATENT DOCUMENTS

| | | | |
|---|---|---|---|
| 3,010,289 A | 11/1961 | Kuklinski | |
| 3,367,131 A | 2/1968 | Foessl | |
| 4,614,090 A | 9/1986 | Kaneko et al. | |
| 4,850,197 A * | 7/1989 | Taylor | F25B 47/022 62/81 |
| 5,020,320 A * | 6/1991 | Talbert | F24D 15/04 62/238.7 |
| 5,174,123 A * | 12/1992 | Erickson | F25B 5/04 62/278 |
| 6,467,291 B1 | 10/2002 | Takano et al. | |
| 9,134,058 B2 | 9/2015 | Ikemiya et al. | |
| 9,726,416 B2 | 8/2017 | Steele | |
| 9,789,744 B2 | 10/2017 | Steele et al. | |
| 10,428,844 B1 * | 10/2019 | Holt | B60P 3/20 |
| 2014/0020414 A1 * | 1/2014 | Rusignuolo | F25D 11/003 62/115 |
| 2014/0223933 A1 | 8/2014 | Steele et al. | |
| 2015/0292784 A1 * | 10/2015 | Yamanis | F01N 5/02 417/376 |
| 2018/0195789 A1 | 7/2018 | Swab | |
| 2018/0202703 A1 | 7/2018 | Ferguson | |

FOREIGN PATENT DOCUMENTS

| | | |
|---|---|---|
| DE | 2418196 A1 * | 11/1975 |
| DE | 2418196 A1 | 11/1975 |
| EP | 0699883 A2 | 3/1996 |
| EP | 3217120 A1 | 9/2017 |
| JP | H0769092 B2 * | 7/1995 |
| JP | 2530152 B2 * | 9/1996 |
| JP | 4288577 B2 | 7/2009 |
| WO | 2018102636 A1 | 6/2018 |

OTHER PUBLICATIONS

Written Opnion No. PCT/US2019/049360; dated Oct. 28, 2019; pp. 10.

* cited by examiner

TRANSPORT REFRIGERATION UNIT WITH ENGINE HEAT FOR DEFROSTING

BACKGROUND

The following description relates to transport refrigeration and, more specifically, to a transport refrigeration unit in which engine heat is used for defrosting.

Transport refrigeration units usually use an engine to provide power for driving compressor and fan sections. In these or other cases, waste heat from the engine is rejected to ambient surroundings via a radiator in a glycol refrigeration loop element. Meanwhile, transport refrigeration units typically also need extra components, such as electrical heaters and hot gas by-pass valves, for executing the defrosting operations and for executing capacity control operations at low loads.

BRIEF DESCRIPTION

According to aspects of the disclosure, a transport refrigeration unit is provided and includes a compressor, a condenser, an expansion valve, an evaporator, piping fluidly coupling the compressor and the condenser, a fluid loop to produce heated fluid from an engine, which is configured to drive operations of the compressor, a heat exchanger disposed in the refrigeration cycle such that the heated fluid thermally interacts with refrigerant of the refrigeration cycle and a hot gas bypass valve to control a quantity of refrigerant removed from the piping.

In accordance with additional or alternative embodiments, the heat exchanger is between the evaporator and the compressor and disposed along the fluid loop and the hot gas bypass valve controls bypass flows of the refrigerant between the piping and second piping between the expansion valve and the evaporator.

In accordance with additional or alternative embodiments, the heat exchanger is between the condenser and the expansion valve and disposed along the fluid loop and the hot gas bypass valve controls bypass flows of the refrigerant between the piping and second piping between the condenser and the heat exchanger.

In accordance with additional or alternative embodiments, a controller is configured to operate the hot gas bypass valve.

In accordance with additional or alternative embodiments, the condenser includes an outer diameter coil.

In accordance with additional or alternative embodiments, a pump pumps the heated fluid through the fluid loop.

In accordance with additional or alternative embodiments, the heated fluid includes glycol.

According to another aspect of the disclosure, a transport refrigeration unit is provided and includes a compressor, an expansion valve, a condenser, an evaporator, first piping fluidly coupling the compressor and the condenser, second piping fluidly coupling the expansion valve and the evaporator, a fluid loop to produce heated fluid from an engine, which is configured to drive operations of the compressor, a heat exchanger between the evaporator and the compressor and along the fluid loop such that the fluid heated in the fluid loop thermally interacts with refrigerant of the refrigeration cycle and a hot gas bypass valve to control a quantity of the refrigerant directed from the first piping toward the second piping.

In accordance with additional or alternative embodiments, the fluid loop includes a pump, an engine to produce the heated fluid in the driving of the operations of the compressor and a radiator through which heated fluid is pumped by the pump and by which waste heat of the engine is rejected.

In accordance with additional or alternative embodiments, a controller is configured to operate the hot gas bypass valve.

In accordance with additional or alternative embodiments, the condenser includes an outer diameter coil.

In accordance with additional or alternative embodiments, the fluid heated by the engine includes glycol.

According to yet another aspect of the disclosure, a transport refrigeration unit is provided and includes a compressor, an expansion valve, a condenser, an evaporator, first piping fluidly coupling the compressor and the condenser, second piping fluidly coupling the condenser and the heat exchanger, a fluid loop to produce heated fluid from an engine, which is configured to drive operations of the compressor, a heat exchanger between the condenser and the expansion valve and along the fluid loop such that the fluid heated in the fluid loop thermally interacts with refrigerant of the refrigeration cycle and a hot gas bypass valve to control a quantity of the refrigerant directed from the first piping toward the second piping.

In accordance with additional or alternative embodiments, the fluid loop includes a pump, an engine to produce the heated fluid in the driving of the operations of the compressor and a radiator through which heated fluid is pumped by the pump and by which waste heat of the engine is rejected.

In accordance with additional or alternative embodiments, a controller is configured to operate the hot gas bypass valve.

In accordance with additional or alternative embodiments, the condenser includes an outer diameter coil.

In accordance with additional or alternative embodiments, the fluid heated by the engine includes glycol.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, waste heat from an engine is leveraged to support defrosting processes and capacity controls at certain (i.e., low) loads. Heat from the engine will be delivered, in some cases, from a glycol loop to a refrigerant cycle through a glycol-refrigerant heat exchanger. This glycol-refrigerant heat exchanger can be added and installed at downstream from an evaporator whereby, at low loads, the engine heat will be supplied to increase compressor inlet superheating capacity, which is monitored for primary expansion valve (EXV) control. The EXV will thus decrease a flow rate and reduce a cooling capacity that is delivered by the evaporator. During a defrosting mode, a hot gas by-pass valve will be turned on with the primary EXV fully closed. Here, the engine heat will be leveraged to accelerate defrosting processes. In another similar case, the glycol-refrigerant heat exchanger can be added and installed downstream from a condenser (i.e., downstream from an OD coil of the condenser).

Figure 1:
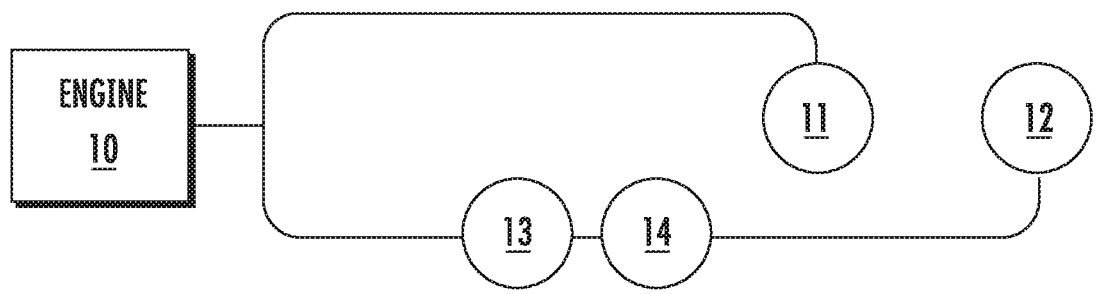
FIG. 1 is a perspective view of an engine unit in accordance with embodiments.

With reference to FIG. 1, an engine driven transport refrigeration system 1 is provided and includes an engine 10. The engine 10 drives an air management system 11 and a refrigeration circuit 12. A compressor 13 and an economizer 14 can be fluidly interposed between the engine 10 and the refrigeration circuit 12. The refrigeration circuit 12 can be disposed downstream from a fan of the air management system 11 such that the fan drives a flow of cooled air, which is generated by the refrigeration circuit 12 outwardly.

Figure 2:
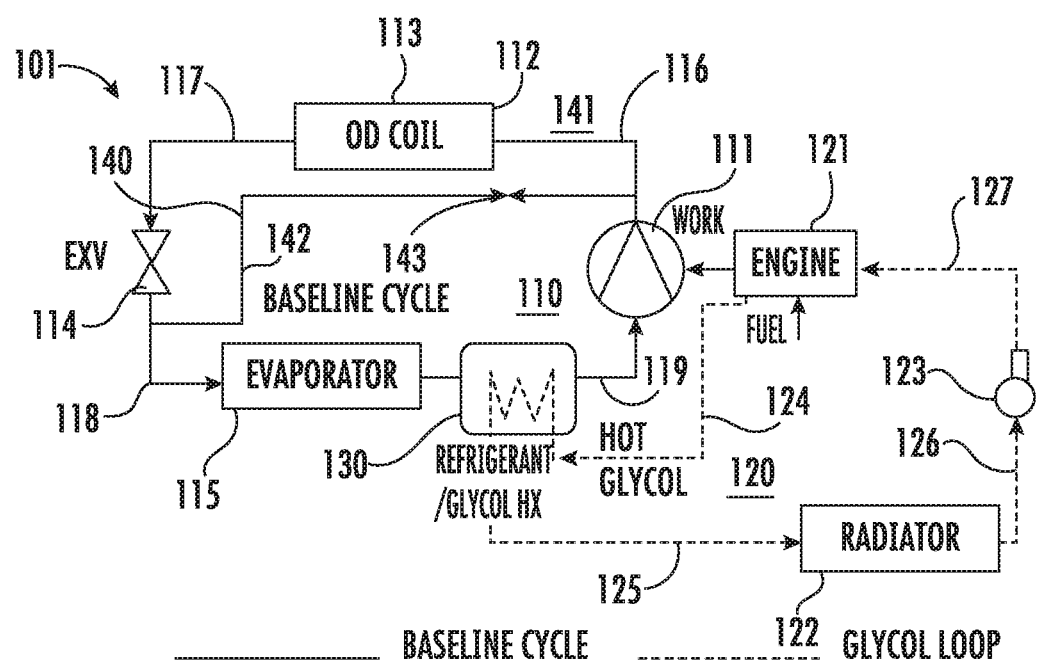
FIG. 2 is a schematic diagram of a transport refrigeration unit in which a glycol-refrigerant heat exchanger is installed downstream of an evaporator in accordance with embodiments.
Figure 3:
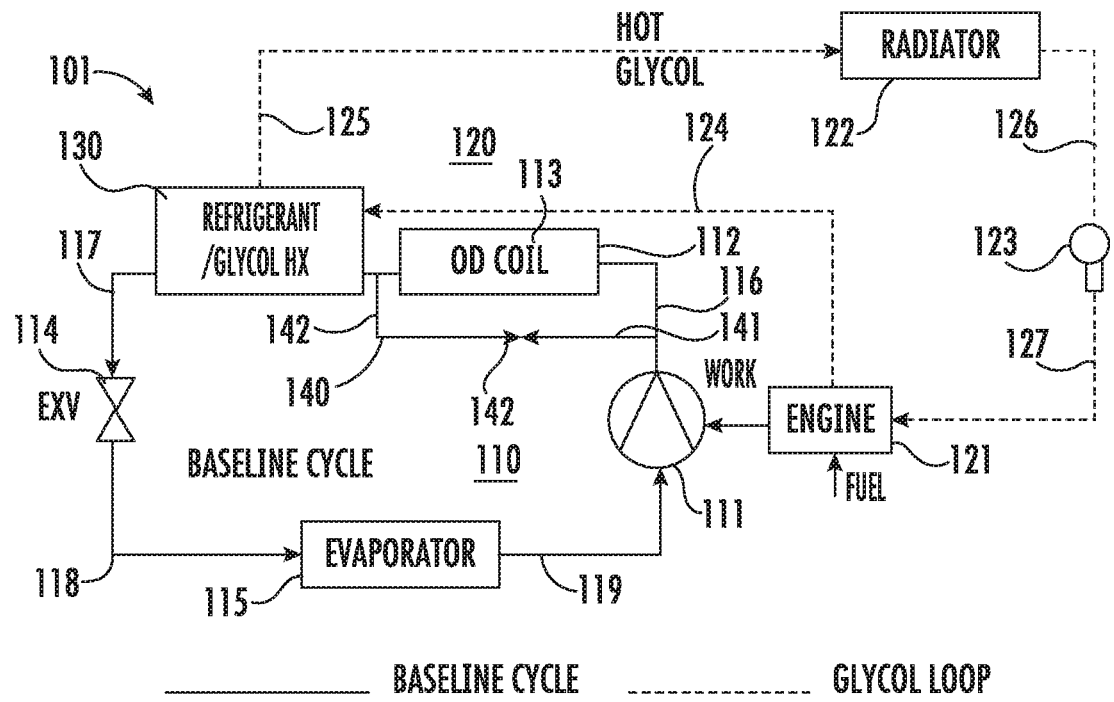
FIG. 3 is a schematic diagram of a transport refrigeration unit in which a glycol-refrigerant heat exchanger is installed downstream of the condenser in accordance with embodiments.

With reference to FIGS. 2 and 3, a transport refrigeration unit 101 is provided. The transport refrigeration unit 101 includes a refrigeration cycle 110 and a fluid loop 120. The transport refrigeration unit 101 further includes a heat exchanger 130 and a hot gas bypass valve 140.

The refrigeration cycle 110 includes a compressor 111 (i.e., the compressor 13 of the engine driven transport refrigeration system 1 of FIG. 1) to compress inlet fluid, a condenser 112 with an outer diameter (OD) coil 113 to condense the fluid compressed in the compressor 111, an expansion valve 114 to control an expansion of the condensed fluid and an evaporator 115 in which the expanded condensed fluid evaporates. The expansion valve 114 is opposite the compressor 111. The condenser 112 is fluidly interposed between the compressor 111 and the condenser 112 and the evaporator 115 is fluidly interposed between the condenser 112 and the compressor 111.

The refrigeration cycle 110 also includes first refrigeration cycle (RC) piping 116, second RC piping 117, third RC piping 118 and fourth RC piping 119. The first RC piping 116 is provided to fluidly couple an outlet of the compressor 111 and an inlet of the condenser 112. The second RC piping 117 is provided to fluidly couple an outlet of the condenser 112 and an inlet of the expansion valve 114. The third RC piping 118 is provided to fluidly couple an outlet of the expansion valve 114 and an inlet of the evaporator 115. The fourth RC piping 119 is provided to fluidly couple an outlet of the evaporator 115 and an inlet of the compressor 111.

The fluid loop 120 includes an engine 121, a radiator 122 and a pump 123. The engine 121 receives a supply of fuel and combusts the fuel to drive operations of the compressor 111. In so doing, the engine 121 heats and thus produces a heated fluid, such as glycol or another similar fluid. This heated fluid is pumped by the pump 123 through the radiator 122 and then back through the engine 121.

The fluid loop 120 also includes first fluid loop (FL) piping 124, second FL piping 125, third FL piping 126 and fourth FL piping 127. The first FL piping 124 extends from an outlet of the engine 121, the second FL piping extends toward an inlet of the radiator 122, the third FL piping is provided to fluidly couple an outlet of the radiator 122 with the pump 123 and the fourth FL piping is provided to fluidly couple the pump 123 with an inlet of the engine 121.

The heat exchanger 130 is disposed in and along the refrigeration cycle 110 such that the heated fluid (i.e., of the glycol) of the fluid loop 120 thermally interacts with refrigerant of the refrigeration cycle 110. The hot gas bypass valve 140 includes inlet piping 141, which is fluidly coupled to the first RC piping 116 between the outlet of the compressor 111 and the inlet of the condenser 112, outlet piping 142 and a valve element 143. The outlet piping 142 is fluidly coupled to either the third RC piping 118 between the outlet of the expansion valve 114 and the inlet of the evaporator 115 (see FIG. 2) or the second RC piping 117 between the outlet of the condenser 112 and the inlet of the expansion valve 114 (see FIG. 3). The valve element 143 is fluidly interposed between the inlet piping 141 and the outlet piping 142. The hot gas bypass valve 140 is thus configured to control bypass flows of the refrigerant from the first RC piping 116 between the compressor 111 and the condenser 112.

In accordance with embodiments and as shown in FIG. 2, the heat exchanger 130 is disposed along the fourth RC piping 119 of the refrigeration cycle 110 between the outlet of the evaporator 115 and the inlet of the compressor 111 and is fluidly coupled along the fluid loop 120 between the first FL piping 124 and the second FL piping 125. Here, the hot gas bypass valve 140 controls bypass flows of the refrigerant between the first RC piping 116 provided between the compressor 111 and the condenser 112 and the third RC piping 118 between the expansion valve 114 and the evaporator 115.

In accordance with embodiments and as shown in FIG. 3, the heat exchanger 130 is disposed along the second RC piping 117 of the refrigeration cycle 110 between the outlet of the condenser 112 and the inlet of the expansion valve 114 and is fluidly coupled along the fluid loop 120 between the first FL piping 124 and the second FL piping 125. Here, the hot gas bypass valve 140 controls bypass flows of the refrigerant between the first RC piping 116 provided between the compressor 111 and the condenser 112 and the second RC piping 117 upstream from the heat exchanger 130 between the condenser 112 and the expansion valve 114.

Figure 4:
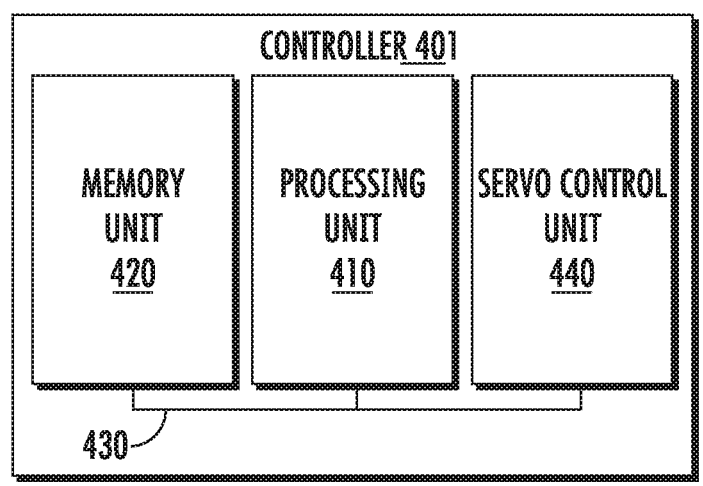
FIG. 4 is a schematic diagram of a controller of the transport refrigeration units of FIGS. 2 and 3 in accordance with embodiments.

With reference to FIG. 4, the transport refrigeration unit 101 may also include a controller 401 that is configured to operate the hot gas bypass valve 140.

That is, for the embodiments of FIG. 2, the controller 401 is configured to open or close the hot gas bypass valve 140 to increase or decrease bypass flows of the refrigerant between the first RC piping 116 provided between the compressor 111 and the condenser 112 and the third RC piping 118 between the expansion valve 114 and the evaporator 115. Thus, at low loads, heat generated by the engine 121 will be supplied to the heat exchanger 130 to increase a compressor inlet superheat condition, which is monitored for controlling the operations of the expansion valve 114 such that the expansion valve 114 will decrease flow rates and reduce cooling capacities deliverable by the evaporator 115. Meanwhile, during defrosting modes, the hot gas bypass valve 140 will be turned on (i.e., opened) by the controller 401 with the expansion valve 114 fully closed so that the heat generated by the engine 121 will be leveraged to accelerate defrosting processes.

For the embodiments of FIG. 3, the controller 401 is configured to open or close the hot gas bypass valve 140 to increase or decrease bypass flows of the refrigerant between the first RC piping 116 provided between the compressor 111 and the condenser 112 and the second RC piping 117 upstream from the heat exchanger 130 between the condenser 112 and the expansion valve 114.

As shown in FIG. 4, the controller 401 includes a processing unit 410, a memory unit 420, an input/output (I/O) unit 430 and a servo control unit 440. The I/O unit 430 controls data flows into and out of the processing unit 410 and the servo control unit 440 controls various components of the transport refrigeration unit 101, such as the hot gas bypass valve 140, in accordance with instructions issued by the processing unit 410. The memory unit 420 has executable instructions stored thereon, which are readable and executable by the processing unit 410. When they are read and executed by the processing unit 410, the executable instructions cause the processing unit 410 to operate as described herein.

Technical effects and benefits of the present disclosure are the potential integration of the proposed systems with existing refrigeration systems and engine glycol cooling loops. In any case, implementation of the proposed systems could eliminate a need for the usage of electrical defrost heaters and could accelerate hot gas by-pass defrosting processes without consuming extra power. An implementation of the proposed systems could also help to reduce a size of a box heater for capacity controls at certain loads.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit, comprising:
   a refrigeration circuit which comprises:
     a compressor;
     a condenser;
     an expansion valve;
     an evaporator;
     first piping fluidly coupling the compressor and the condenser; and
     second piping fluidly coupling the condenser and a heat exchanger,
   wherein the transport refrigeration unit further comprises:
   a fluid loop to produce heated fluid from an engine, the engine configured to drive operations of the compressor;
   the heat exchanger, which is disposed in the refrigeration circuit downstream from the condenser and upstream of the expansion valve and along the fluid loop such that the heated fluid thermally interacts with refrigerant of the refrigeration circuit; and
   a hot gas bypass valve to control bypass flows of the refrigerant between the first piping and the second piping to control a quantity of the refrigerant removed from the first piping to the second piping upstream the heat exchanger,
   wherein the hot gas bypass valve comprises inlet piping coupled to the first piping, outlet piping coupled to the second piping and a valve element fluidly interposed between the inlet piping and the outlet piping.

2. The transport refrigeration unit according to claim 1, further comprising a controller configured to operate the hot gas bypass valve.

3. The transport refrigeration unit according to claim 1, wherein the condenser comprises an outer diameter coil.

4. The transport refrigeration unit according to claim 1, further comprising a pump to pump the heated fluid through the fluid loop.

5. The transport refrigeration unit according to claim 1, wherein the heated fluid comprises glycol.

6. A transport refrigeration unit, comprising:
   a refrigeration circuit comprising first piping fluidly coupling a compressor and a condenser and second piping;
   a heat exchanger, which is disposed in the refrigeration circuit downstream from the condenser and upstream of an expansion valve and which is fluidly coupled to the condenser by the second piping;
   a fluid loop to produce heated fluid from an engine and configured to drive operations of the compressor, the heat exchanger being disposed along the fluid loop whereby the heated fluid thermally interacts with refrigerant of the refrigeration circuit; and
   a hot gas bypass valve to control bypass flows of the refrigerant between the first piping and the second piping to control a quantity of the refrigerant removed from the first piping to the second piping upstream the heat exchanger.

7. The transport refrigeration unit according to claim 6, wherein the hot gas bypass valve comprises inlet piping coupled to the first piping, outlet piping coupled to the second piping and a valve element fluidly interposed between the inlet piping and the outlet piping.

8. The transport refrigeration unit according to claim 6, further comprising a controller configured to operate the hot gas bypass valve.

9. The transport refrigeration unit according to claim 6, wherein the condenser comprises an outer diameter coil.

10. The transport refrigeration unit according to claim 6, further comprising a pump to pump the heated fluid through the fluid loop.

11. The transport refrigeration unit according to claim 6, wherein the heated fluid comprises glycol.

* * * * *